(12) United States Patent
Taylor et al.

(10) Patent No.: US 7,510,065 B2
(45) Date of Patent: Mar. 31, 2009

(54) MOUNTING OF A FLYWHEEL OF A CLUTCH, SUPPORTING THE ROTOR OF A ROTATING ELECTRIC MACHINE, ON THE CRANKSHAFT OF A VEHICLE ENGINE

(75) Inventors: Gordon Taylor, West Sussex (GB); Fabrice Tauvron, Athis-Mons (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 765 days.

(21) Appl. No.: 10/488,308

(22) PCT Filed: Sep. 12, 2002

(86) PCT No.: PCT/FR02/03100

§ 371 (c)(1),
(2), (4) Date: Oct. 20, 2004

(87) PCT Pub. No.: WO03/023222

PCT Pub. Date: Mar. 20, 2003

(65) Prior Publication Data

US 2005/0045135 A1 Mar. 3, 2005

(30) Foreign Application Priority Data

Sep. 12, 2001 (FR) .................................. 01 11973

(51) Int. Cl.
*F02N 11/04* (2006.01)
*F16F 15/315* (2006.01)

(52) U.S. Cl. .................. 192/115; 192/110 B; 310/74; 310/78

(58) Field of Classification Search ................ 192/115
See application file for complete search history.

(56) References Cited

U.S. PATENT DOCUMENTS

| 4,894,570 | A | * | 1/1990 | Kaneyuki | 310/113 |
| 4,898,038 | A | * | 2/1990 | Kitamura | 74/6 |
| 4,918,323 | A | * | 4/1990 | Aso | 290/46 |
| 5,927,452 | A | | 7/1999 | Freise et al. | |
| 6,253,437 | B1 | | 7/2001 | Levin | |
| 2001/0043019 | A1 | * | 11/2001 | Heyden et al. | 310/74 |

FOREIGN PATENT DOCUMENTS

| EP | 0 302 118 | 2/1989 |
| FR | 2 782 353 | 2/2000 |
| FR | 2782355 | 2/2000 |

* cited by examiner

Primary Examiner—Richard M. Lorence
(74) Attorney, Agent, or Firm—Berenato, White & Stavish

(57) ABSTRACT

The assembly is characterized in that the casing (62) of the engine of the motor vehicle carries, fastened to it, an axially projecting sleeve (246), in that the crankshaft (11) is lengthened axially by an extension (111), which firstly penetrates into the interior of the sleeve (246), and secondly serves for fastening the flywheel(13) of the clutch, and in that a bearing (346) is interposed radially between the extension (111) and the sleeve (246), being located radially inwards of the rotor (6).

20 Claims, 4 Drawing Sheets

MOUNTING OF A FLYWHEEL OF A CLUTCH, SUPPORTING THE ROTOR OF A ROTATING ELECTRIC MACHINE, ON THE CRANKSHAFT OF A VEHICLE ENGINE

CROSS-REFERENCE TO RELATED APPLICATION(S)

The present application is a Section 371 National Stage Application of International Application No. PCT/FR02/03100, filed Sep. 12, 2002 and published as WO 2003/023222, in French.

FIELD OF THE INVENTION

The present invention relates to an assembly of a flywheel of a clutch, carrying the rotor of a rotary electrical machine, on the crankshaft of an internal combustion engine of a motor vehicle, as described in the document FR-A-2 782 355 (WO00/06897).

BACKGROUND OF THE INVENTION

It is seen in FIG. 1 of the above mentioned document that the flywheel of the clutch carries at its rear end the reaction plate of a friction clutch, and has a sleeve which extends towards the casing of the internal combustion engine, referred to as the engine, of the motor vehicle. The sleeve carries the rotor of a rotary electrical machine, which is thereby incorporated in the clutch. This machine comprises, in the known way, a fixed stator surrounding the rotor, with an airgap between the inner periphery of the stator and the outer periphery of the rotor.

The front end of the sleeve, which is also the front end of the flywheel, is fixed on the crankshaft of the engine.

The rotor has a significant weight, and, like the reaction plate and the clutch, it is cantilevered from the front end of the sleeve.

As is known, the crankshaft vibrates when the engine of the vehicle is working.

This gives rise to troublesome dynamic knocking effects in the region of the airgap between the stator and rotor, so that the airgap can vary and has to be dimensioned accordingly, which is detrimental to the performance of the machine. In addition, because of the cantilevers, inertias and weights of the rotor and clutch, the crankshaft and its bearings are subjected to strong applied forces, which is detrimental to the mechanical strength and useful life of the crankshaft.

In the embodiment of FIG. 4 in the document FR-A-2 782 355, a constant airgap is obtained by use of a carrier member.

Although that solution is satisfactory, the carrier member increases overall size. In addition, it calls for the use of a ball bearing of large size, interposed radially between the carrier member and the flywheel. The same is true in the embodiment in FIG. 1 of the document U.S. Pat. No. 6,253,437.

OBJECT OF THE INVENTION

The object of the present invention is to overcome these disadvantages in a simple and inexpensive way.

It is therefore an object of the invention to obtain an independent airgap which is insensitive to all disturbances linked to operation of the internal combustion engine of the vehicle, such as vibrations, dynamic knocking, and play, while protecting the crankshaft, and in particular the bearings of the latter.

According to the invention, an assembly of a flywheel of a clutch, carrying the rotor of a rotary electrical machine, on the crankshaft of an internal combustion engine of a motor vehicle, of the kind mentioned above, is characterised in that the casing of the engine of the motor vehicle carries, fastened to it, an axially projecting sleeve, in that the crankshaft is lengthened axially by an extension, which firstly penetrates into the interior of the sleeve, and secondly serves for fastening the flywheel of the clutch, and in that a bearing means is interposed radially between the extension and the sleeve, being located radially inwards of the rotor.

Thanks to the invention, the extension and the sleeve are fitted coaxially, so that through the operation of the bearing means, the fixed sleeve is a sleeve which takes up applied forces, and which penetrates into the central aperture of the rotor.

The extended crankshaft is therefore well supported, and the airgap is insensitive to the disturbances resulting from operation of the engine of the motor vehicle. It will be appreciated that the airgap is constant and is reduced even further, because the flywheel, being fixed on the extension supported by the bearing means, is also less sensitive to disturbances resulting from operation of the engine of the motor vehicle. The performance of the machine is therefore improved.

The crankshaft bearings are protected because of the presence of the supplementary bearing means.

In addition, the assembly is simplified because the sleeve is simpler in form than the carrier member which, in the document U.S. Pat. No. 6,253,437, constitutes a spacer between the casing of the engine and the cover of the clutch.

In one embodiment, one of the crankshaft bearings is omitted and is replaced by the bearing means according to the invention, which is fitted in line with the rotor, that is to say directly below the rotor. For this purpose, the sleeve penetrates, with axial and radial clearances, into a cavity of the flywheel which is delimited firstly by a first portion having an axially oriented surface for mounting the rotor thereon, and secondly by a second portion for fastening the flywheel on the extension.

The solution enables the dimensions between the casing of the engine and the reaction plate to be reduced without detriment to the performance of the machine.

In addition, the radial dimension of the bearing means is small, because it is in contact with the extension of the crankshaft. It is therefore inexpensive. This bearing means can have whatever axial length is desired.

Omission of the carrier member of the prior art makes the solution inexpensive. In addition, no additional machining of the flywheel is necessary.

The reduction in overall size enables the friction clutch to be fitted with a wear take-up device that compensates for wear in the friction liners and maintains the clutch engaging means of the clutch, such as a diaphragm, always in the same position when the clutch is engaged (with the friction liners gripped between the pressure and reaction plates of the clutch). It is possible to give the clutch other functions.

Similarly, it is possible, because of the absence of the carrier member, to increase the axial thicknesses of the rotor and stator, giving improved performance for the machine.

Markers or targets are conventionally provided for measuring the speed of rotation of the engine and for adjusting the ignition of the engine. These markers are for example carried by the flywheel, and in particular by the reaction plate. This gives improved accuracy of the measurements because the flywheel is also insensitive to the disturbances set up by the engine.

In another version, the bearing means consists of a ball-bearing with, either, one row or two rows of balls.

In a further version, in order to reduce the diametral size of the bearing means and sleeve, as well as the radial size of the machine, the bearing means consists of a needle bearing, or, preferably, a cushion member or, in general terms, a plain bearing, which is made for example of reinforced and/or lubricated plastics material, this being less expensive.

Preferably, the bearing means is lubricated, and in one embodiment it consists of a cushion member lubricated by the engine oil of the vehicle.

In this case, the load bearing sleeve has at least one passage for return of oil to the casing, and the crankshaft has delivery passages for supplying the cushion member with oil.

A seal, such as a lip seal, is then interposed between the inner periphery of the sleeve and the outer periphery of the extension.

The said extension has, at the level of the bearing means, a radially projecting local portion, the largest diameter of which enables the clutch flywheel also to be fixed.

In one embodiment, the projecting portion constitutes the free end of the crankshaft and has a nose for centring the clutch flywheel.

In one embodiment, the first part of the flywheel consists of an axially oriented sleeve and the second part is a transversely oriented annular ring.

In a further version, of course, the sleeve is of ribbed form. The first part is not necessarily in the form of a sleeve because radial space is saved.

BRIEF DESCRIPTION OF THE DRAWINGS

The attached description illustrates the invention with reference to the attached drawings, in which.

Figure 1:
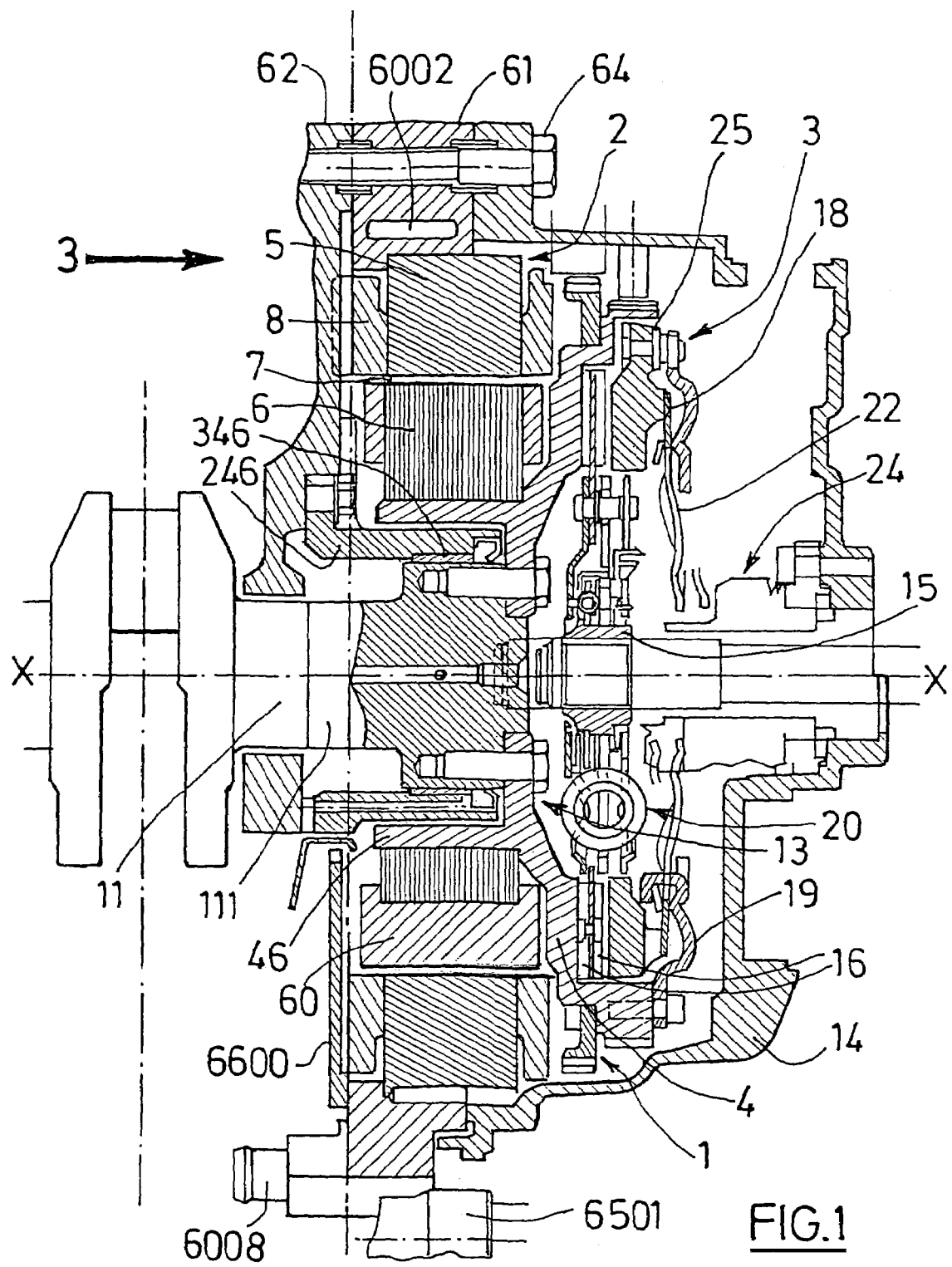
FIG. 1 is a view in axial cross section of the assembly according to the invention.

DESCRIPTION OF PREFERRED
EMBODIMENTS OF THE INVENTION

In the drawings, those elements which are common with those in the document FR-A-2 782 355 will be given the same reference signs, so that reference can be made to that document for more details. Thus, in FIG. 1, an apparatus for stopping and starting an internal combustion engine of a motor vehicle is shown at 1.

The apparatus 1 is interposed axially between the engine of the vehicle and the motion transmission unit, such as a manual or automatic gearbox of the motor vehicle. In this example, the transmission unit is a gearbox having a casing which includes at the front hollow portions which, in particular, constitute a clutch cover 14 and a passage for a transmission shaft 6501 between the wheels of the vehicle. The shaft 6501 is located close to the clutch cover 14.

The apparatus 1 includes a friction clutch 3 and a rotary electrical machine 2 which in the present case is of a synchronous type. This machine includes a stator 5 surrounding a rotor 6. The stator and rotor have, in the known way, a body or core in the form of a stack of laminations. The body of the rotor is configured for the mounting of a squirrel cage 60, while the body of the stator has grooves, which are for example semi-closed, for mounting electrical conductors which constitute the armature windings 8 of the machine. These conductors are those of conventional windings, wound from wire or consisting of bars, for example U-shaped hairpins, the ends of the branches of which are welded so as to constitute at least one coil per phase as can be seen in the document U.S. Pat. No. 2,928,963, or in the document WO92/06527; the machine is of the polyphase type.

The machine is for example of the three-phase type, with the windings star-connected. In another version and as explained in the document U.S. Pat. No. 2,928,963, the number of phases is more than three.

In all cases, the conductive wires or conductive hairpins extend through the body of the stator within grooves in the latter, and extend to the outside of the stator body so as to constitute a first and a second chignon, projecting axially in the known way.

The friction clutch 3 includes a reaction plate 4 of mouldable material, which is a casting in this case and which is part of an annular driving flywheel 13 which constitutes the flywheel of the clutch and which, in accordance with one feature of the invention, has a simplified form as compared with that in the document FR-A-2 782 355.

The stator 5 of the rotary electrical machine is carried internally by a spacer 61 which has an internal cooling chamber 6002 for circulation of a heat transfer fluid, such as the coolant liquid for the engine of the vehicle, whereby to evacuate heat and cool the stator.

This spacer 61 is fitted at the outer periphery of the cover 14, and is interposed axially between the casing 62 of the engine of the motor vehicle and the clutch cover 14 which is fixed to the motion transmission unit, the input shaft, which constitutes a driven shaft, being seen at 12. The engine has a driving shaft in the form of a crankshaft, the output end portion of which consists of a shaft 11. This output end portion will simply be referred to as a shaft. The axial axis of symmetry of the shaft 11 is aligned with that of the shaft 12, so as to define an axial axis of symmetry X-X which is the axis of rotation of the shafts 11, 12 of the clutch 3 and of the rotor 6, as is described below.

The cover 14 surrounds the reaction plate 4. Screws 64 secure the spacer 61 and clutch cover to the casing 62 of the engine of the vehicle. These screws have a head which bears on a radial flange formed on the free end of the cover 14. The screws extend through the flange of the cover and the spacer, to be screwed into threaded bores in the casing 62 and so secure the spacer. The cooling chamber 6002 of the spacer 61 is in the form of a channel within which a heat transfer fluid flows, in the manner described in the embodiment of FIG. 14 in the document FR-A-2 782 355, reference to which is invited.

In accordance with a feature (FIG. 3), the inlet and outlet ducts 6008 for the heat transfer fluid are disposed at the circumferential ends of an opening 6500 for permitting passage of the transmission shaft 6501 between the wheels of the motor vehicle, so that the spacer is open at this point.

The opening 6500 has a contour in the form of an arc of a circle. Any other form may of course be envisaged; the spacer is recessed at this point. This arrangement enables the outer diameter of the stator 5 to be increased by local interruption of the chamber 6002 at this point; the ducts 6008 are disposed on either side of the opening 6500.

The spacer 61, stator 5 and rotor 6 are annular in form and are mounted coaxially with each other.

There is a precise and constant airgap 7 between the inner periphery of the stator 5 and the outer periphery of the rotor 6, which is carried by the flywheel 13 so that the rotary electrical machine 2 is incorporated in the friction clutch 3.

The machine 2 is interposed between the casing 62 of the engine of the vehicle and the reaction plate 4.

The flywheel 13 includes a first part in the form of an axially oriented sleeve 46 which is directed axially towards the casing 62.

The outer periphery of the sleeve 46 constitutes an axially oriented mounting surface for the rotor 6, which in this case is force-fitted on the said surface. For this purpose, the outer periphery of the sleeve 46 has a shoulder at its axial end furthest from the casing 62 of the engine of the vehicle.

The sleeve 46 is integral with the reaction plate 4, with which it is moulded integrally.

The flywheel 13 has at its inner periphery a central, transversely oriented, second part in the form of an annular fastening ring 140, which is formed with holes for the passage of fastening members 245 securing the flywheel 13 to the shaft 11 of the crankshaft. The ring 140 is joined, through a frusto-conical portion 142, to the inner periphery of the reaction plate 4, which is thereby offset axially with respect to the ring 140 in the direction away from the casing 62.

The sleeve 46 is joined to the outer periphery of the sleeve 140, and projects axially with respect to the ring 140, extending at right angles to the axis X-X. The sleeve 46 is directed axially towards the casing 62 and is joined to the frusto-conical portion 142 in such a way that there is an axial clearance between the rotor 6 and reaction plate 4. There is of course an axial clearance between the rotor 6 and casing 62.

Figure 4:
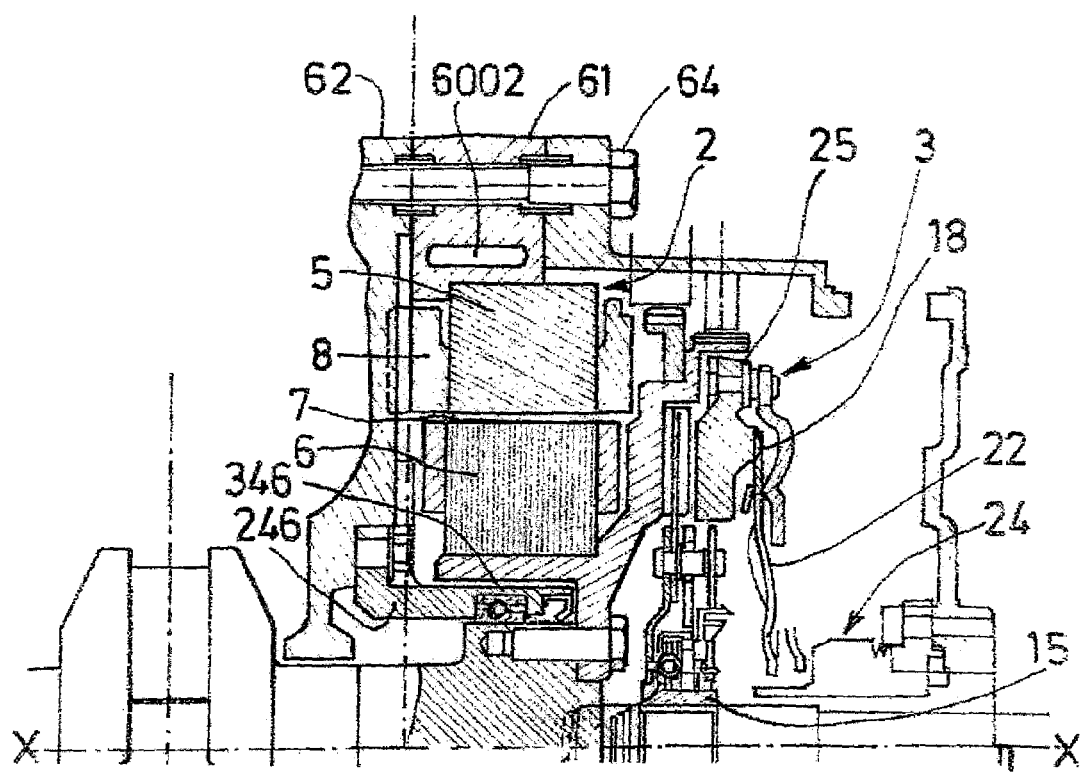
FIG. 4 is a view in axial cross section of the assembly of FIG. 1, with an example of bearing means.

The clutch flywheel 13 is made in one piece; its parts 140, 142, 4, 46 are of moulded form. It will be noted that the flywheel 13 has a configuration similar to that of FIG. 4 in the document FR-A-2 782 355. Nevertheless, it will be noted that the sleeve 46 in FIG. 1 of the present Application may extend to the vicinity of the casing 62, and that the inner periphery of the sleeve 46 is not machined. It is thus possible to increase the axial length of the rotor and stator of the machine, and therefore its power.

In addition, the outer diameter of the sleeve 46 in FIG. 1 is smaller than the outer diameter of the sleeve in the document mentioned above, so that the diametral size of the machine 2 is reduced.

Moreover, the frusto-conical portion 142 is inclined axially by a lesser amount than in the above mentioned document, so that the axial distance between the ring 140 and plate 4 is reduced.

The absence of a carrier member will also be noted, as will that of a rolling bearing, of large size and therefore expensive, acting between the carrier member and sleeve 46.

Omission of the carrier member enables the axial dimension between the casing 62 and plate 4 to be reduced.

The solution is therefore simple and inexpensive, while enabling the axial and radial dimensions between the casing 62 and reaction plate 4 to be reduced, and without detriment to the performance of the machine.

This is achieved by virtue of the mounting of the clutch flywheel 13, carrying the rotor 6, on the shaft 11 of the crankshaft in accordance with the invention.

More precisely, the shaft 11 is longer in the axial direction, and therefore has an axial extension 111 extending towards the reaction plate 4. This extension 111 constitutes the free end portion of the crankshaft of the internal combustion engine of the motor vehicle. The flywheel 13 is fixed at the end of the extension 111 by means of its ring 140.

The casing 62 carries, fixed to it, a cylindrical sleeve 246 which extends axially towards the reaction plate 4 and which at least partly surrounds the extension 111, which in this example is cylindrical. The sleeve 246 has at its axial end, adjacent to the casing, a transversely oriented collar portion 247 which extends outwards away from the axis X-X. The collar portion 247 is formed with holes for fastening the sleeve on the casing 62 with the aid of screws 248. In another version, the sleeve 246 is integral with the casing. The same is true of the spacer 61, which may be made integrally with the casing 62 or clutch cover 14.

A bearing means 346 is interposed radially between the inner periphery of the sleeve 246 and the outer periphery of the extension 111. This bearing means 346 is fitted radially within the rotor 6 and sleeve 46. The sleeve penetrates, with radial and axial clearance, into the cavity which is delimited by the sleeve 46 and ring 140. The bearing means 346 is fitted in line with the rotor 6. The transverse line which passes through the centre of gravity of the assembly that consists of the rotor 6 and sleeve 46 passes through the bearing means 346. Preferably, in the embodiment shown, the radial plane of symmetry of the rotor 6, extending at right angles to the axis X-X and passing through the middle of the rotor, is coincident with the radial plane of symmetry of the bearing means 346.

The invention is accordingly characterised in that the casing 62 of the engine of the motor vehicle carries, fixed to it, an axially projecting sleeve 246, in that the crankshaft 11 is extended axially by an extension 111 which firstly penetrates into the inside of the sleeve 246 and secondly serves for fastening the flywheel 13 of the clutch, and in that a bearing means 346 is interposed radially between the extension 111 and the sleeve 246, being fitted radially inside the rotor 6.

Because of these features, an airgap 7 is obtained which is both precise and as small as possible, as well as improved mechanical strength of the crankshaft because of the sleeve and the bearing means which is in contact with the extension 111. The performance of the machine 2 is improved.

The supplementary bearing means 346 provides relief for the crankshaft bearings.

In the embodiment in FIG. 1, the bearing means 346 replaces one of the crankshaft bearings.

In all cases, it has the required axial length.

In this example, the bearing means 346 is axially shorter than the rotor 6.

The extension 111 has a radially projecting local portion 211 at the level of the bearing means 346, which in this example is in the form of a cushion. In the drawings, the portion 211 is cylindrical, and the plain bearing 346 is tubular.

The projecting portion 211 constitutes the free end of the crankshaft 11, and has a nose 311 for centring the flywheel 13. The nose 311 is cylindrical. It has an outer diameter which corresponds to the inner diameter of the ring 140, so that the said peripheries are in intimate contact for centring the ring 140 by means of the nose 311, the outer diameter of which is smaller than that of the portion 211. Accordingly, a transverse shoulder is defined for engagement with the ring 140. This shoulder is defined by the axial end face of the portion 211.

The flywheel 13 in this example is fixed on the projecting portion 211 at the end of the latter, in this example by means of screws 245, the heads of which bear on the central ring 140 of the flywheel. The threaded portion of each screw 245 extends through the ring 140, which is perforated for this purpose, so that each screw is screwed into a female thread of the portion 211 to secure the ring 140 in contact with the axial end face of the portion 211. In place of the screws 215, it is of course possible to make use of gudgeon pins or nuts or any other fastening member.

Figure 2:
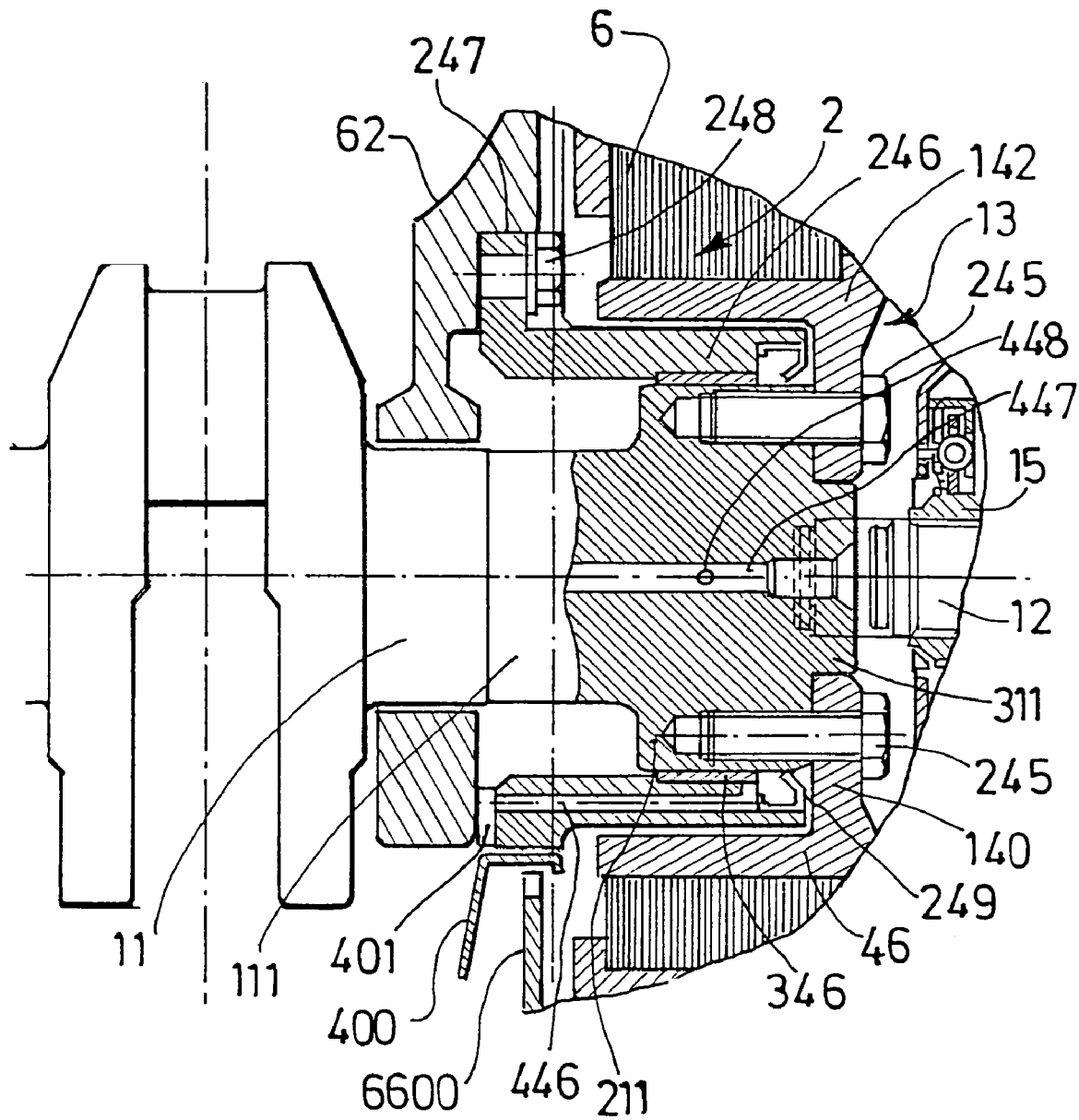
FIG. 2 is a scrap view on an enlarged scale of the central part of FIG. 1.

The cushion member 346 is lubricated by the lubricating oil of the engine of the vehicle, as is best seen in FIG. 2. For this purpose, the crankshaft 11 has within its thickness a central axial oil passage 447, into which radial passages 448, spaced apart at regular intervals, are open so as to supply the cushion member 346 with oil from the engine. The passages 448 are open radially at the level of the cushion member 346 into the middle part of the latter. The cushion member is mounted inside the sleeve by means of a first increase in diameter formed integrally in the sleeve at the level of the outer periphery of the portion 211.

The passage 447 is closed off by a closure, not given a reference numeral. The passages 447, 448 are therefore oil feed passages.

The oil is able to approach the ring 140, so that a seal 249, which in this example is a lip seal, must be provided. This seal 249 is in contact with the outer periphery of the portion 211, and is in contact with the inner periphery of the sleeve 246, which for this purpose has at its free end a second increase in diameter. The sleeve accordingly has three internal diameters.

The sleeve 246 also has in its lower part, within its thickness, at least one axial passage 446 for return of the oil to the oil sump 400. The passage or passages 446 extend axially through the sump so as to terminate, firstly at the level of the seal 249, and secondly in the sump 400 which is situated in the lower part of the engine, with a transverse passage 401 being defined between the casing 62 and the collar portion 247.

Figure 3:
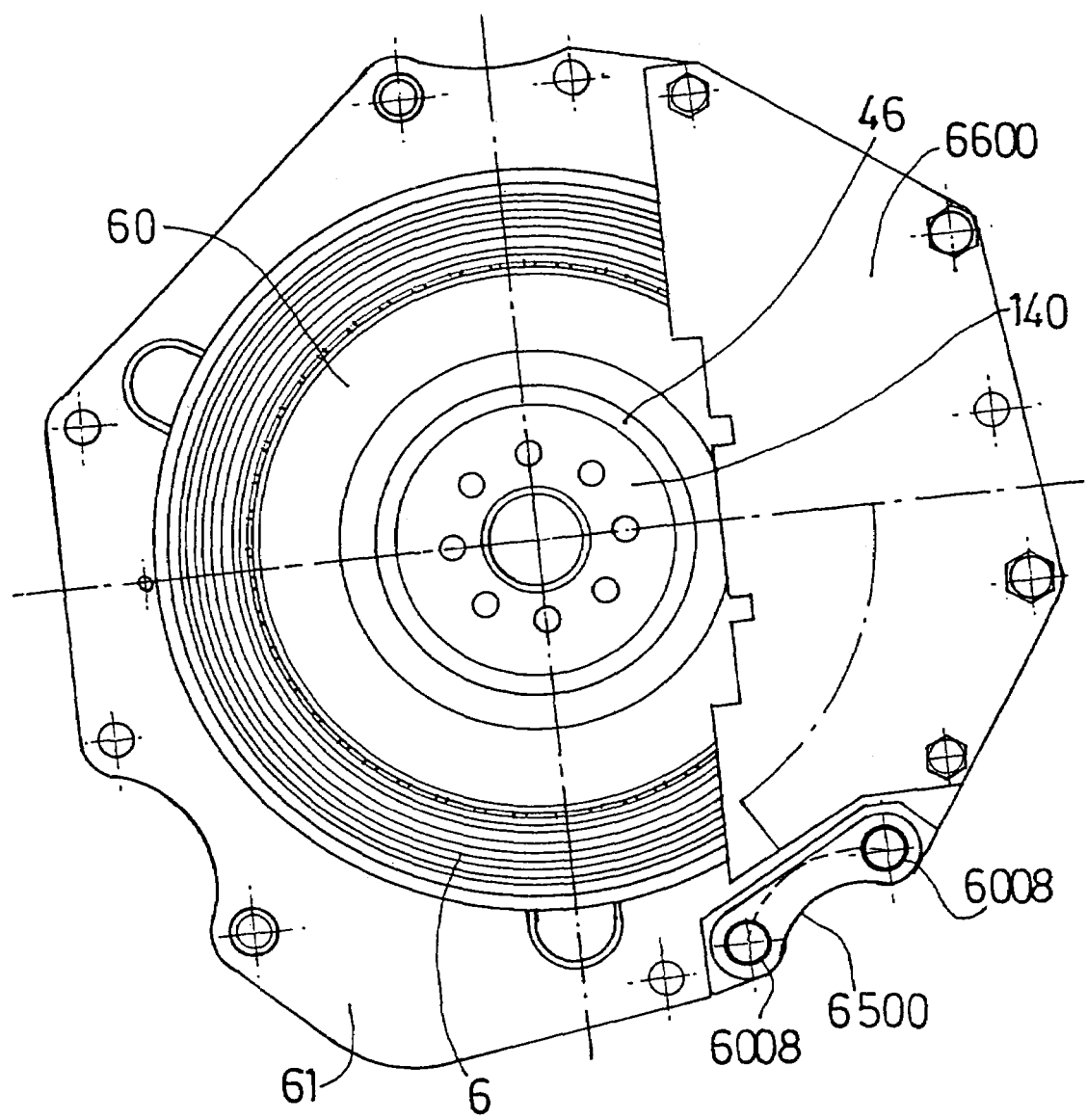
FIG. 3 is a view in the direction of the arrow 3 in FIG. 1, but without the motor casing, without the crankshaft and without the sleeve.

A plate 6600 is fixed on the spacer 61 as can be seen in FIG. 3. This plate is located facing the sump so as to protect the rotor and stator against splashing.

A locating element is of course provided for the circumferential mounting of the sleeve and its passage 446 in the correct position (with the passage 446 in a lower position). For example, the collar portion 247 and the sleeve has a hole for receiving a cotter pin carried by the casing 62.

The machine 2 has several functions. It constitutes a current generator in the form of an alternator for the power consuming components of the vehicle, and also acts as a starter for the vehicle. It enables the engine of the vehicle to be stopped at red lights and then to be restarted.

All the functions of the machine are described for example in the documents FR-A-2 782 355 and WO98/05882, to which reference is invited.

It will be recalled that the output ends of the armature windings 8 are connected to an electronic command and control module. This module is for example fitted on the outside of the assembly of the invention, and, as described in the document FR-A-2 782 353, the spacer 61 carries a connector which is connected, firstly to the outputs of the armature winding phases, and, secondly, by means of cables to the electronic command and control module.

The friction clutch 3 has the same structure as that described in FIG. 3 of the document FR-A-2 782 355, to which reference is invited.

Thus, the clutch is accordingly of the type having a diaphragm 18, 22 which bears on a bead of a cover plate 19 fixed to the outer periphery of the reaction plate. The cover plate has lugs, formed by stamping out and bending, which extend axially through the apertures in the diaphragm, to be bent radially outwards so that they constitute a locating bend for a crown ring which offers a secondary abutment for the diaphragm. A pressure plate 17 is coupled in rotation to the cover plate 19 by means of tangential tongues 25 which permit axial movement of the pressure plate 17, which has a passage for engagement of the outer periphery of the Belleville ring 18 of the diaphragm. A friction disc 20 has, at its outer periphery, friction liners 16 which are adapted to be gripped between the pressure plate 17 and reaction plate 4, each of which has for this purpose a friction face for the liner 16 concerned. The liners 16 are fixed to a support which is connected, rigidly or, preferably, elastically, through a torsion damper, to a hub 15 which is splined internally for coupling it in rotation with the shaft 12, which has splines complementary to those on the hub 15.

The clutch is therefore normally engaged, so that the torque is transmitted between the shafts 11 and 12. In order to disengage the clutch, pressure is exerted on the inner ends of the fingers 22 of the diaphragm, in this case by pushing with the aid of a clutch release bearing 24, so as to cause the diaphragm to pivot about the crown ring and thereby cause the action of the Belleville ring 18 of the diaphragm on the plate to cease, so releasing the liners 16 and disengaging the clutch 3. In this position, the torque is no longer transmitted from the shaft 11 to the shaft 12. The clutch is therefore a stopping and starting device.

The clutch release bearing 24 is of the hydraulically controlled type, concentric with the shaft 12; the hydraulic control includes a guide tube fixed to the base of the cover and serving as a guide for a piston carrying a ball bearing, one of the rings of which is arranged to act on the fingers 22.

In another version, it may of course be controlled electronically or by means of a declutching fork. The other versions which are described in the document FR-A-2 782 355 can also be envisaged. The same is true as regards the electrical machine 2.

It will be noted that the reaction plate 4 has at its outer periphery an axially oriented annular flange surrounding the reaction plate 17 and having a toothed target or marker element for measuring the speed of rotation of the engine by means of a sensor.

The said flange is joined, through a transverse annular shoulder, to an axially oriented, annular, second shoulder which surrounds the liners 16 and is joined to the outer periphery of the reaction plate 4. The shoulder serves for fastening of an adjacent component of the stator 5, and serving as an ignition marker for use in adjusting the ignition of the engine of the vehicle. FIG. 1 shows the sensors associated with these markers, reading of which is precise thanks to the invention, so rendering the flywheel insensitive to disturbances caused by the operation of the engine of the vehicle.

In the drawings, the extension 111 is integral with the crankshaft. In another version, it is carried at the end of the crankshaft, for example by screwed attachment. The same is true for the sleeve 46, which in another version is secured by screwing or riveting on the flywheel.

It will be appreciated that the crankshaft, because of the fitting of the bearing means 346, is better protected than in a solution of the kind described in the document EP-0 302 118, because, firstly, the bearing means 246 is closer to the engine flywheel, and, secondly, a sleeve 246 is provided for absorbing forces. Cantilevers are reduced.

The invention claimed is:

1. An assembly of a flywheel of a clutch, carrying a rotor of a rotary electrical machine, on a crankshaft of an internal combustion engine of a motor vehicle, the engine having a casing, wherein the casing of the engine of the motor vehicle carries, fastened to it, an axially projecting sleeve, wherein the crankshaft is lengthened axially by an extension, which firstly penetrates into the interior of the sleeve, and secondly serves for fastening the flywheel of the clutch, and wherein a bearing means is interposed radially between the extension and the sleeve, being located radially inwards of the rotor.

2. An assembly according to claim 1, wherein the bearing means is lubricated.

3. An assembly according to claim 1, wherein the bearing means comprises a ball bearing with either one row or two rows of balls.

4. An assembly according to claim 2, wherein the bearing means is a plain bearing.

5. An assembly according to claim 4, wherein the plain bearing is lubricated by engine oil of the motor vehicle.

6. An assembly according to claim 5, wherein the crankshaft has inlet passages, and the sleeve has a return passage, for supplying the plain bearing with the engine oil.

7. An assembly according to claim 1, wherein the extension has, at the level of the bearing means, a radially projecting local portion.

8. An assembly according to claim 7, wherein the radially projecting local portion constitutes a free end of the crankshaft and has a nose for centering the clutch flywheel.

9. An assembly according to claim 7, wherein the flywheel, equipped with the rotor of the rotary electrical machine, is fixed on an end of the projecting local portion.

10. An assembly according to claim 1, wherein the sleeve penetrates, with clearances, into a cavity of the flywheel delimited by a first portion having an axially oriented surface for mounting thereon the rotor of the rotary electrical machine, and by a second portion for fastening the flywheel on the extension.

11. An assembly comprising:
- an internal combustion engine of a motor comprising a crankshaft and a casing, the casing carrying an axially projecting sleeve;
- a rotor of a rotary electrical machine;
- a flywheel of a clutch carrying the rotor, the flywheel situated on the crankshaft, the axially projecting sleeve being situated interior to the flywheel;
- an extension axially lengthening the crankshaft for fastening the flywheel, the extension being situated interior to the axially projecting sleeve; and
- bearing means interposed radially between the extension and the sleeve, and located radially inward of the rotor.

12. An assembly according to claim 11, wherein the bearing means is lubricated.

13. An assembly according to claim 11, wherein the bearing means comprises a ball bearing with either one row or two rows of balls.

14. An assembly according to claim 12, wherein the bearing means comprises a plain bearing.

15. An assembly according to claim 14, wherein the plain bearing is lubricated by engine oil of the motor vehicle.

16. An assembly according to claim 15, wherein the crankshaft has inlet passages, and the sleeve has a return passage, for supplying the plain bearing with the engine oil.

17. An assembly according to claim 11, wherein the extension has, at the level of the bearing means, a projecting local portion.

18. An assembly according to claim 17, wherein the projecting local portion constitutes a free end of the crankshaft and has a nose for centering the clutch flywheel.

19. An assembly according to claim 17, wherein the flywheel, equipped with the rotor of the rotary electrical machine, is fixed on an end of the projecting local portion.

20. An assembly according to claim 11, wherein the sleeve penetrates, with clearance, into a cavity of the flywheel delimited by a first portion having an axially oriented surface for mounting thereon the rotor of the rotary electrical machine, and by a second portion for fastening the flywheel on the extension.

* * * * *